(12) United States Patent
Kim

(10) Patent No.: US 12,045,412 B2
(45) Date of Patent: Jul. 23, 2024

(54) ELECTRONIC DEVICE, ACTIVE STYLUS PEN, METHOD OF SYNCHRONIZING THEREOF

(71) Applicant: SAMSUNG ELECTRONICS CO., LTD., Suwon-si (KR)

(72) Inventor: Kiup Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/241,593

(22) Filed: Sep. 1, 2023

(65) Prior Publication Data

US 2024/0077971 A1 Mar. 7, 2024

(30) Foreign Application Priority Data

Sep. 5, 2022 (KR) .................. 10-2022-0112347

(51) Int. Cl.
*G06F 3/041* (2006.01)
*G06F 3/0354* (2013.01)
*G06F 3/038* (2013.01)
*G06F 3/044* (2006.01)

(52) U.S. Cl.
CPC ...... *G06F 3/04162* (2019.05); *G06F 3/03545* (2013.01); *G06F 3/0383* (2013.01); *G06F 3/0441* (2019.05); *G06F 3/0442* (2019.05); *G06F 3/0416* (2013.01)

(58) Field of Classification Search
CPC .. G06F 3/04162; G06F 3/0416; G06F 3/0441; G06F 3/0442; G06F 3/03545; G06F 3/0383

USPC ......................................................... 345/179
See application file for complete search history.

(56) References Cited

U.S. PATENT DOCUMENTS

| | | | |
|---|---|---|---|
| 9,519,361 B2 | 12/2016 | Harley et al. | |
| 9,563,292 B2 * | 2/2017 | Hamaguchi | G06F 3/0446 |
| 9,727,166 B2 | 8/2017 | Takeda et al. | |
| 9,880,649 B2 | 1/2018 | Agarwal et al. | |
| 10,067,580 B2 | 9/2018 | Shahparnia | |
| 10,691,228 B2 | 6/2020 | Bae et al. | |
| 11,262,858 B2 | 3/2022 | Bakken et al. | |
| 2016/0070372 A1 * | 3/2016 | Hamaguchi | G06F 3/0446 345/179 |
| 2016/0070374 A1 * | 3/2016 | Hamaguchi | G06F 3/0446 345/174 |
| 2016/0091919 A1 * | 3/2016 | Takeda | G06F 3/038 345/174 |

(Continued)

*Primary Examiner* — Tom V Sheng
(74) *Attorney, Agent, or Firm* — Sughrue Mion, PLLC

(57) ABSTRACT

A method performed by at least one processor of synchronizing an active stylus pen with an electronic device, the method comprising: receiving, by the active stylus pen, a synchronization start signal from the electronic device via wireless communication between the active stylus pen and the electronic device; in response to receiving the synchronization start signal, calculating, by the active stylus pen, a plurality of transmission timings at which a position signal corresponding to a position of the active stylus pen is transmitted to the electronic device, the calculating being performed on the basis of a point in time at which the synchronization start signal is received; and transmitting, by the active stylus pen on the basis of the plurality of transmission timings, the position signal to the electronic device.

20 Claims, 13 Drawing Sheets

(56) References Cited

U.S. PATENT DOCUMENTS

| | | | |
|---|---|---|---|
| 2016/0098124 A1* | 4/2016 | Takeda | G06F 3/0446 |
| | | | 345/174 |
| 2016/0117019 A1* | 4/2016 | Takeda | G06F 3/03 |
| | | | 345/174 |
| 2016/0224136 A1* | 8/2016 | Kremin | G06F 1/3259 |
| 2016/0334890 A1* | 11/2016 | Holsen | G06F 3/0443 |
| 2017/0108984 A1* | 4/2017 | Takaya | G06F 3/0441 |
| 2017/0147140 A1* | 5/2017 | Kosugi | G06F 1/163 |
| 2017/0192549 A1* | 7/2017 | Katayama | G06F 3/041 |
| 2018/0164909 A1* | 6/2018 | Bae | G06F 3/04162 |
| 2018/0314364 A1* | 11/2018 | Yeh | G06F 3/0383 |
| 2020/0125188 A1* | 4/2020 | Meng | G06F 3/0383 |
| 2022/0011916 A1* | 1/2022 | Chen | G06F 3/04162 |
| 2023/0125764 A1* | 4/2023 | Kim | G06F 3/0441 |
| | | | 345/173 |

\* cited by examiner

ELECTRONIC DEVICE, ACTIVE STYLUS PEN, METHOD OF SYNCHRONIZING THEREOF

CROSS-REFERENCE TO RELATED APPLICATION

This application is based on and claims priority under 35 U. S. C. § 119 to Korean Patent Application No. 10-2022-0112347, filed on Sep. 5, 2022, in the Korean Intellectual Property Office, the disclosure of which is incorporated by reference herein in its entirety.

BACKGROUND

1. Field

Embodiments of the present disclosure relate to a method of synchronizing devices with each other, and more particularly, to an active stylus pen synchronizing with a device, and a method of synchronizing thereof.

2. Description of Related Art

Various types of electronic devices and input devices have been developed to receive inputs from users via input devices (e.g., active stylus pens) connected with electronic devices via a communication protocol. For example, mobile devices and input devices may be implemented, for provision of various functions and the convenience of users, in a form capable of controlling operations of mobile devices by using input devices having pen functions.

Active stylus pens may include wireless communication functions, and may synchronize with electronic devices via the wireless communication functions to perform (e.g., via displays of synchronized electronic devices) a function of identifying locations thereof on electronic devices designated by the active stylus pens, and various functions (e.g., functions related to pressure information of the active stylus pens, battery information, event information according to inputs, etc.) corresponding thereto. However, current methods of synchronizing a pen with an electronic device do not provide sufficiently accurate synchronization, and consume significant amounts of power.

SUMMARY

When a direct communication method is used to synchronize an electronic device with an active stylus pen, communication is vulnerable to interference and noise, and thus, an error may occur when a function is performed. In addition, when a synchronization signal is transmitted for synchronization via wireless communication, periodic transmission of the synchronization signal is needed, and thus, power consumption may increase. The embodiments provide an apparatus capable of reducing an effect of interference and noise in communication between an electronic device and an active stylus pen, and reducing power consumption for synchronization therebetween, and a method thereof.

According to one or more embodiments, a method performed by at least one processor of synchronizing an active stylus pen with an electronic device, the method comprising: receiving, by the active stylus pen, a synchronization start signal from the electronic device via wireless communication between the active stylus pen and the electronic device; in response to receiving the synchronization start signal, calculating, by the active stylus pen, a plurality of transmission timings at which a position signal corresponding to a position of the active stylus pen is transmitted to the electronic device, the calculating being performed on the basis of a point in time at which the synchronization start signal is received; and transmitting, by the active stylus pen on the basis of the plurality of transmission timings, the position signal to the electronic device.

The calculating the plurality of transmission timings includes: calculating a first transmission timing from the point in time at which the synchronization start signal is received; and sequentially repeating the timing calculation from the first transmission timing to an $N^{th}$ transmission timing, wherein N is a natural number greater than or equal to 2.

The transmitting the position signal includes transmitting the position signal to the electronic device on the basis of at least one transmission timing selected from among the plurality of transmission timings.

The method further comprising stopping calculating the plurality of transmission timings based on a determination that a pairing between the active stylus pen and the electronic device stops.

The transmitting the position signal includes transmitting the position signal on the basis of the plurality of transmission timings after the active stylus pen receives a start signal that is received after the synchronization start signal.

The calculating the plurality of transmission timings includes using parameters indicating an offset, a connection interval, and a frame period.

The method further comprising performing a clock synchronization between the electronic device and the active stylus pen before the active stylus pen receives the synchronization start signal.

According to one or more embodiments, an electronic device configured to synchronize with an active stylus pen, the electronic device comprising: a processor; a touch panel configured to detect a position signal of the active stylus pen; a wireless device configured to transmit a synchronization start signal to the active stylus pen via wireless communication between the electronic device and the active stylus pen; and a touch controller configured to perform frame synchronization by receiving a first synchronization signal from the wireless device, wherein the touch controller is configured to receive, via the touch panel, the position signal of the active stylus pen synchronized on the basis of the synchronization start signal.

The wireless device is configured to transmit a second synchronization signal to the touch controller, and the touch controller is configured to perform oscillator trimming on a clock on the basis of the second synchronization signal.

The touch controller performs a frame delay on the basis of the first synchronization signal to perform the frame synchronization.

The touch controller is configured to transmit a synchronization complete signal to the processor in response to a completion of the frame synchronization, the processor is configured to transmit a first start signal to the wireless device in response to reception of the synchronization complete signal, and the wireless device is configured to transmit a second start signal to the active stylus pen in response to reception of the first start signal.

The touch controller is configured to transmit a timeout signal to the processor in response to not receiving the position signal of the active stylus pen during a first period.

The processor is configured to transmit an idle signal to the wireless device in response to reception of the timeout signal.

The processor is configured to stop pairing with the active stylus pen in response to not receiving the position signal of the active stylus pen via the touch controller during a second period after transmitting the idle signal.

The wireless device is configured to stop transmitting the first synchronization signal to the touch controller in response to the pairing being stopped.

The electronic device is configured to perform clock synchronization with the active stylus pen before the wireless device transmits the synchronization start signal to the active stylus pen.

An active stylus pen configured to synchronize with an electronic device, the active stylus pen comprising: at least one electrode; a wireless device configured to receive a synchronization start signal from the electronic device via wireless communication between the active stylus pen and the synchronization start signal; and a controller configured to transmit a position signal to the electronic device via the at least one electrode, wherein the controller is configured to calculate, in response to reception of the synchronization start signal, a plurality of transmission timings of the position signal on the basis of a point in time at which the synchronization start signal is received.

The controller is configured to calculate a first transmission timing from the point in time at which the synchronization start signal is received, and configured to sequentially repeat the timing calculation from the first transmission timing to an $N^{th}$ transmission timing, wherein N is a natural number greater than or equal to 2.

The controller is configured to select at least one transmission timing from among the plurality of transmission timings of the position signal, and configured to transmit the position signal to the electronic device on the basis of each of the selected at least one transmission timing.

The controller is configured to transmit the position signal on the basis of the plurality of transmission timings of the position signal after the wireless device receives a start signal from the electronic device, wherein the start signal is received after synchronization start signal.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
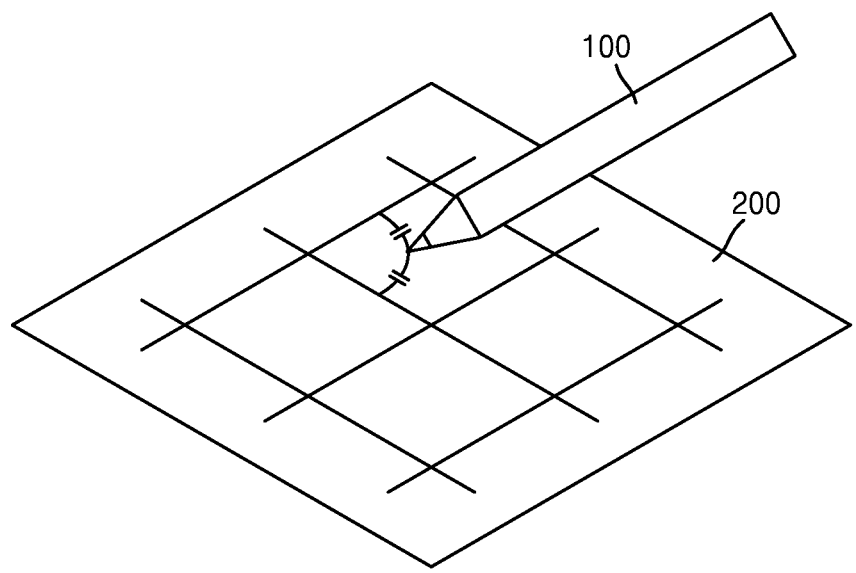
FIG. 1 is a view illustrating an active stylus pen, and a touch panel device of an electronic device, according to one or more embodiments.

FIG. 1 is a view illustrating an active stylus pen, and a touch panel device of an electronic device, according to one or more embodiments.

Figure 2:
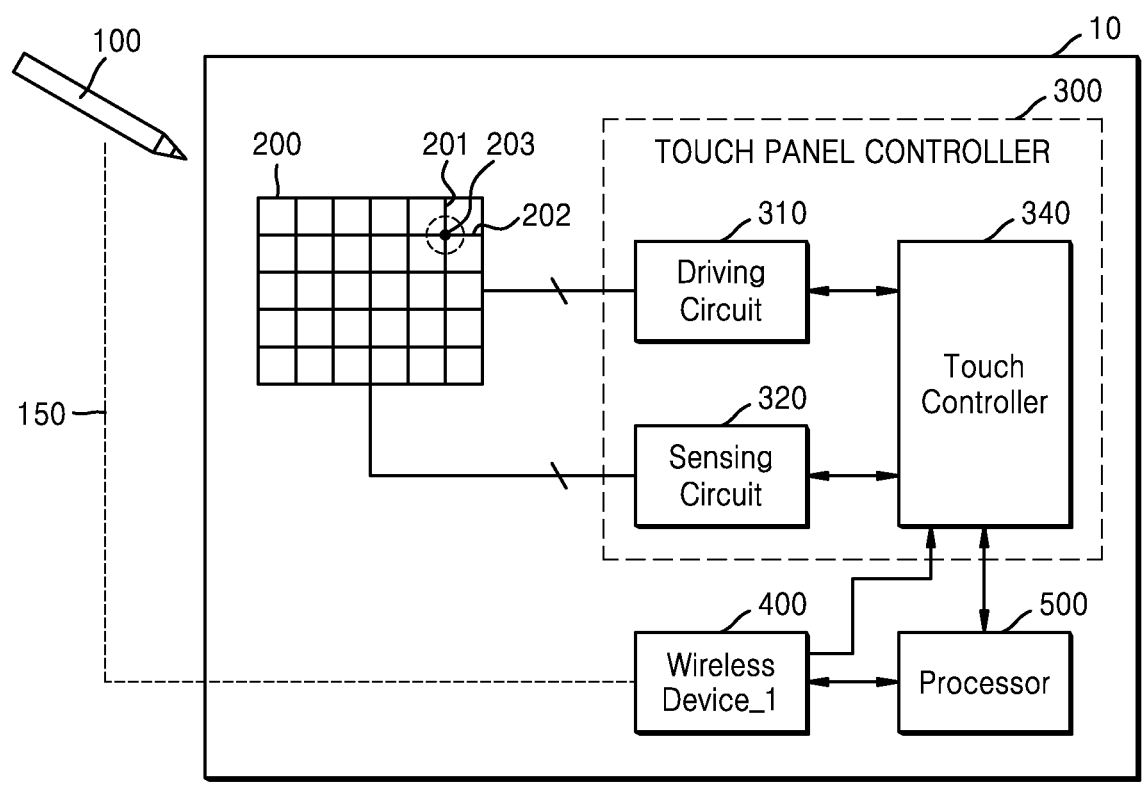
FIG. 2 is a block diagram illustrating a structure of an electronic device according to one or more embodiments.

Referring to FIG. 1, an active stylus pen 100 may perform a function by touching a touch panel device 200 to perform a user's input function on an electronic device (e.g., an electronic device 10 of FIG. 2). The user may control the electronic device via various functions of the active stylus pen 100. In one or more examples, to perform a function (e.g., selection of an object, drawing of text, ext.) the active stylus pen 100 may come into contact with a screen or surface of the touch panel device 200, or be in proximity of the touch panel device 200 such that the active stylus pen 100 is detected.

In one or more embodiments, the touch panel device 200 may be a touch panel for a display of the electronic device. For example, the touch panel device 200 may be a touch screen of the electronic device (e.g., a mobile device). The mobile device may be implemented as various types of electronic devices including the touch panel device 200, such as a mobile phone, a smartphone, a tablet personal computer (PC), a personal digital assistant (PDA), a portable multimedia player (PMP), and a digital camera, but is not limited thereto, and may include any other electronic device having a touch panel known to one of ordinary skill in the art.

As described below, the active stylus pen 100 may, through a wireless device, receive a signal (e.g., receive a synchronization signal) from the electronic device, and may also transmit a signal to the electronic device, by using a communication channel formed between the electronic device including the touch panel device 200 and the active stylus pen 100. In addition, the active stylus pen 100 may include various types of sensors. In one or more examples, the sensors may include at least one of a geomagnetic sensor, a position sensor, an acceleration sensor, a gyroscope sensor, a proximity sensor, or any other sensor known to one of ordinary skill in the art.

The active stylus pen 100 may transmit a signal to the electronic device by using short-range communication including Bluetooth, infrared, or any other short-range communication method known to one of ordinary skill in the art. In addition, when receiving, via the touch panel device 200, a user input, such as tapping using the active stylus pen 100, the electronic device may generate a control signal corresponding to the received user input.

FIG. 2 is a block diagram illustrating a structure of an electronic device according to one or more embodiments.

Referring to FIG. 2, an electronic device 10 may include a touch panel device 200 on which a touch of an active stylus pen 100 is performed, a touch panel controller 300, a first wireless device 400, and a processor 500. The touch panel controller 300 may detect a signal (e.g., a position signal) or any other signal from the active stylus pen 100.

The electronic device 10 may include the touch panel device 200 for detecting a touch signal or any other signal from a touch device. The touch device may be incorporated as part of an electronic device 10 that may be a mobile device, a touch pad, a portable or desktop computer, a portable media player, or a wearable device. The touch panel device 200 may include an array of touch nodes 203 that may be formed by a double electrode structure, but is not limited thereto. For example, in some embodiments, electrodes may also be formed on the same layer.

In one or more embodiments, the touch nodes 203 may be formed at intersections between row electrodes and column electrodes separated by dielectrics. The row electrodes may form a driving line 202, and the column electrodes may form a sensing line 201. However, configurations and/or structures of a row/driving line and a column/sensing line are not limited thereto. The sensing line 201 may intersect with the driving line 202 in various methods. For example, the sensing line 201 may be perpendicular to the driving line 202, and the touch node 203 having an xy coordinate system may be formed. The touch node 203 may correspond to an intersection between a driving line 202 and a touch node 203. However, other coordinate systems may also be used, and thus, coordinates of the touch node 203 according to the present example may be defined differently. FIG. 2 illustrates a plurality of driving lines 202 and a plurality of sensing lines 201, but the number of driving lines 202 and the number of sensing lines 201 are not limited thereto. Therefore, the touch panel device 200 may include any number of driving lines 202 and any number of sensing lines 201 to form a desired number and pattern of touch nodes 203. Furthermore, although the sensors described above are formed in a pattern of rows and columns, in some embodiments, the sensors may be formed in any suitable one-dimensional, two-dimensional, or three-dimensional pattern of electrodes.

Capacitance of the touch node 203 may appear as mutual capacitance when the driving line 202 is driven. For example, during a mutual capacitance scan, an object (e.g., a user's finger or a passive stylus) near the touch panel device 200 or on the touch panel device 200 may be detected by measuring a change in a signal present at a touch node being touched.

In one or more embodiments, the touch panel controller 300 may include a driving circuit 310, a sensing circuit 320, and a touch controller 340. The touch panel controller 300 may further include a random access memory (RAM) or another type of memory.

The driving circuit 310 may be connected to each of the driving lines 202, where the driving circuit 310 may provide a stimulus signal (e.g., a voltage) to the driving lines 202. Furthermore, the driving circuit 310 may operate on the basis of control of the touch controller 340. The sensing circuit 320 may be connected to each of the sensing lines 201, and the sensing circuit 320 may detect a change in capacitance at the touch node 203. For example, during a mutual capacitance scan, the stimulus signal may be applied to one or more driving lines 202, and charges may be coupled to the sensing line 201 at each touch node 203 due to coupling between one or more driving lines 202 and sensing lines 201. Accordingly, the sensing circuit 320 may detect a change in capacitance at each of the touch nodes 203.

All electrodes (including both the sensing line 201 and the driving line 202) on the touch panel device 200 may be connected to the sensing circuit 320 to detect a change in parasitic capacitance present in each electrode. When a signal is detected through the sensing line 201 after applying a stimulus signal to the driving line 202, as described above, a change in capacitance of the touch node 203 is detected. In contrast, when a signal is received via a sensing line of a corresponding electrode after applying a stimulus signal to a particular electrode regardless of driving or sensing, a parasitic capacitance value of the corresponding electrode is extracted. When a sensing operation as described above is performed on all channels, parasitic capacitance values for all electrodes may be detected. Sensing described above may be distinguished from a mutual capacitance scan and may be referred to as a self-capacitance scan. In a self-capacitance scan operation, an active stylus performs only sensing without applying a stimulus signal to an electrode, and a position signal emitted from the active stylus operates as a stimulus signal.

The sensing circuit 320 may include one or more sensing channels configured to transmit sensed data to the touch controller 340. In one or more embodiments, the sensing circuit 320 may convert an analog signal into digital data and then transmit the digital data to the touch controller 340. In some embodiments, the sensing circuit 320 may transmit an analog capacitance signal to the touch controller 340, and the touch controller 340 may convert data into a digital form. Furthermore, the sensing circuit 320 may include an individual channel for each sensing line 201 or a single sensing channel for all sensing lines 201. The sensing circuit 320 may sense not only a position of the touch node 203, but also the strengths of capacitance (or a change thereof) at the touch node 203 and capacitance (or a change thereof) at each electrode and transmit the sensed position and the sensed strengths of capacitances to the touch controller 340. In one or more embodiments, the touch controller 340, the driving circuit 310, and the sensing circuit 320 may be integrated into an application specific integrated circuit (ASIC).

The processor 500 may receive an output from touch controller 340, and may perform, on the basis of the received output, operations, such as movement of one or more objects (e.g., a pointer), adjustment of control settings, execution of instructions, and operation of a peripheral device connected to a host. However, the function of the processor 500 is not limited thereto, and the processor 500 may overall control the electronic device 10. In one or more embodiments, the processor 500 may execute software or firmware for executing the touch controller 340. The processor 500 may also perform an additional function other than touch panel processing, and may be connected to a display device, such as a display for providing a user interface (UI) to a user, and a program storage device. Accordingly, the electronic device 10 may perform an operation on the basis of a touch detected by processing an output from the touch panel device 200, and a graphical user interface displayed on a screen.

The first wireless device 400 may implement a wireless communication standard, such as Wi-Fi or Bluetooth. The first wireless device 400 may transmit information from the processor 500 to the active stylus pen 100, or may transmit information from the active stylus pen 100 to the processor 500 via the wireless communication channel 150. Furthermore, for example, as described in detail below, the first wireless device 400 may transmit, to the touch controller 340 and the active stylus pen 100, synchronization signals for synchronizing the touch controller 340 with the active stylus pen 100. In one or more examples, the first wireless device 400 may also be included in other components of the electronic device 10. For example, the first wireless device 400 may be included in the touch panel controller 300 or the processor 500.

The electronic device 10 is not limited to the components and configuration of FIG. 2, and may include multiple configurations or additional components according to various embodiments. Furthermore, the components of the electronic device 10 may be included in a single device, or may be distributed among a plurality of devices.

Figure 3:
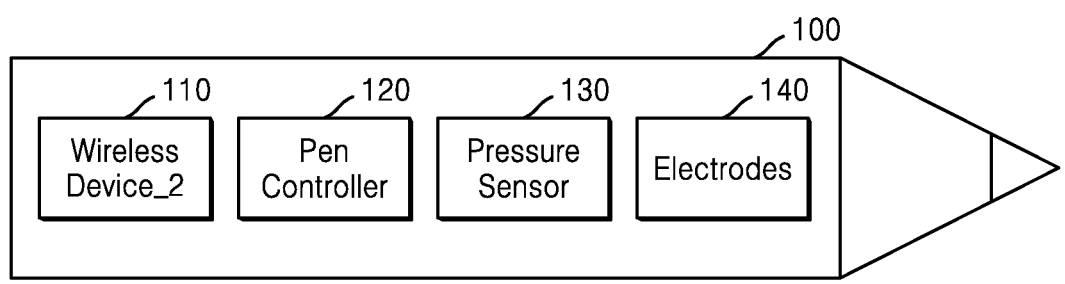
FIG. 3 is a block diagram illustrating a structure of an active stylus pen according to one or more embodiments.

FIG. 3 is a block diagram illustrating a structure of an active stylus pen according to one or more embodiments.

Referring to FIG. 3, an active stylus pen 100 may include a second wireless device 110, a pen controller 120, a pressure sensor 130, and a plurality of electrodes 140.

In one or more embodiments, the active stylus pen 100 may include, for example, a plurality of electrodes 140 that may be located at a tip of the active stylus pen 100. The active stylus pen 100 may include the pen controller 120 for generating one or more stimulus signals from the plurality of electrodes 140 to stimulate the touch panel device 200 of the electronic device 10. Furthermore, the pen controller 120 may control the operations of the active stylus pen 100.

For example, the active stylus pen 100 may include two electrodes 140 located at the tip of the active stylus pen 100 and the pen controller 120 configured to generate stimulus signals at two frequencies. As described above, the touch panel device 200 may receive (or detect) a stimulus signal of the active stylus pen 100 via each of electrodes arranged in the rows 202 and the columns 201 of the touch panel device 200, and the received signal may be processed by the touch controller 340. In some embodiments, as described in detail below, a touch signal received from the active stylus pen 100 may be used to determine a position of the active stylus pen 100 on the touch panel device 200. Information regarding the position of the active stylus pen 100 may be transmitted from the touch controller 340 to the processor 500.

In one or more embodiments, the pen controller 120 may include one or more processors. For example, one or more of the functions of the active stylus pen 100 described herein may be performed by firmware stored in a memory or a program storage, and may be executed by the pen controller 120.

The active stylus pen 100 may also include the pressure sensor 130 for detecting an amount of pressure applied from the tip of the active stylus pen 100. When the tip of the active stylus pen 100 touches the touch panel device 200, the pressure sensor 130 may measure pressure applied from the tip of the active stylus pen 100. Information regarding the pressure may be stored in the active stylus pen 100, or may be transmitted to the electronic device 10 via the second wireless device 110. The pressure information may be transmitted to the processor 500 of the electronic device 10. The pressure information and corresponding position information may be processed together by the processor 500.

The second wireless device 110 of the active stylus pen 100 may communicate with the first wireless device 400 of the electronic device 10. For example, the second wireless device 110 may receive a synchronization start signal for synchronization therebetween from the first wireless device 400. In one or more examples, the second wireless device 110 may transmit, to the first wireless device 400, the pressure information detected via the pressure sensor 130. In other words, as described in detail below, the first wireless device 400 and the second wireless device 110 may be used to transmit and receive signals for synchronization of the electronic device 10 and the active stylus pen 100.

Figure 4:
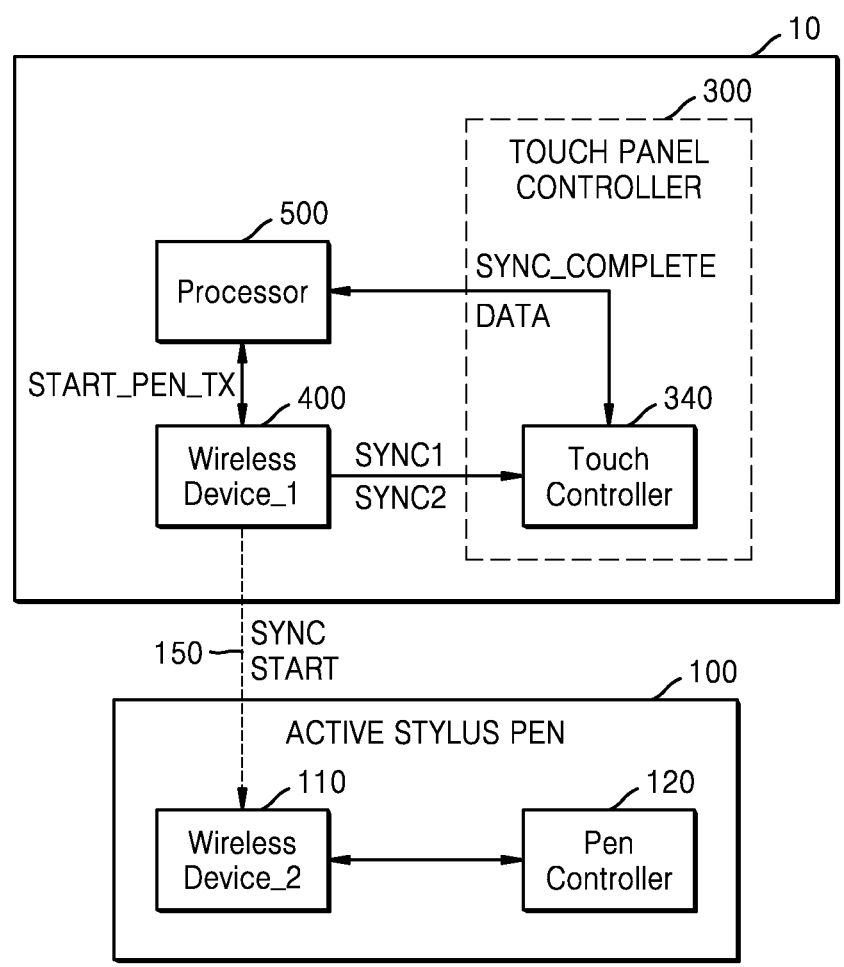
FIG. 4 is a block diagram illustrating structures of an electronic device and an active stylus pen, for synchronization therebetween, according to one or more embodiments.

FIG. 4 is a block diagram illustrating structures of an electronic device and an active stylus pen, for synchronization therebetween, according to one or more embodiments.

Referring to FIG. 4, an electronic device 10 may include a touch panel controller 300, a first wireless device 400, and a processor 500. An active stylus pen 100 may include a second wireless device 110 and a pen controller 120.

Synchronization between the touch controller 340 and the active stylus pen 100 may be needed for the electronic device 10 to receive a signal of the active stylus pen 100 and operate. The first wireless device 400 of the electronic device 10 may transmit a first synchronization signal SYNC1 and a second synchronization signal SYNC2 to the touch controller 340 to synchronize the touch controller 340 with the active stylus pen 100. A frequency of the first synchronization signal SYNC1 and a frequency of the second synchronization signal SYNC2 may be different from each other. For example, the frequency of the first synchronization signal SYNC1 may be lower than the frequency of the second synchronization signal SYNC2.

In one or more embodiments, the touch controller 340 may synchronize a touch frame on the basis of the first synchronization signal SYNC1, and may perform oscillator trimming on the basis of the second synchronization signal SYNC2. For example, via the oscillator trimming, the touch controller 340 may adjust an internal signal (e.g., a clock) used by the touch controller 340. When a synchronization operation is completed, the touch controller 340 may transmit a synchronization complete signal SYNC_COMPLETE to the processor 500. Furthermore, as described above, the touch controller 340 may also transmit, to the processor 500, information (X, Y coordinates) received via the touch panel device 200, the driving circuit 310, and the sensing circuit 320.

When receiving the synchronization complete signal SYNC_COMPLETE, the processor 500 may transmit, to the first wireless device 400, a transmission indication signal START PEN TX indicating a signal transmission start of the active stylus pen 100 to receive a signal of the synchronized active stylus pen 100. When receiving the transmission indication signal START PEN TX, the first wireless device 400 may transmit, to the second wireless device 110, a start signal START indicating the signal transmission start of the active stylus pen 100.

In one or more embodiments, the first wireless device 400 of the electronic device 10 may transmit a synchronization start signal SYNC to the second wireless device 110 to synchronize the active stylus pen 100. The active stylus pen 100 may perform, in response to the synchronization start signal SYNC, a synchronization operation of synchronizing with the touch controller 340. As described in detail below, the pen controller 120 may perform the synchronization operation via an internal calculation thereof. When the synchronization with the touch controller 340 is completed, the pen controller 120 may transmit, on the basis of a transmission timing via a calculation, a signal to the touch controller 340 via the touch panel device 200.

As a result, each of the touch controller 340 and the active stylus pen 100 may perform synchronization on the basis of a synchronization signal of the first wireless device 400. A synchronization method according to one or more embodiments may be performed via wireless communication, rather than a direct communication method (e.g., exchanging an uplink and a downlink via an electrode of the touch panel device 200 or any other component of the touch panel device 200) between the touch controller 340 and the pen controller 120, and thus, may effectively reduce an effect of interference and communication noise flowing in via the electrode of the touch panel device 200. Furthermore, periodic transmission of a synchronization signal is not needed for synchronization therebetween, and signal transmission for synchronization with the active stylus pen 100 is performed once (e.g., a single time), and thus, power consumption may be greatly reduced.

Furthermore, synchronization between devices may be performed on the basis of a synchronization signal of the first wireless device 400 rather than a signal output from the touch controller 340, and thus, periodic synchronization correction for correcting an error present in a touch frame period may not be needed, thereby simplifying a communication process and reducing power consumption.

Figure 5:
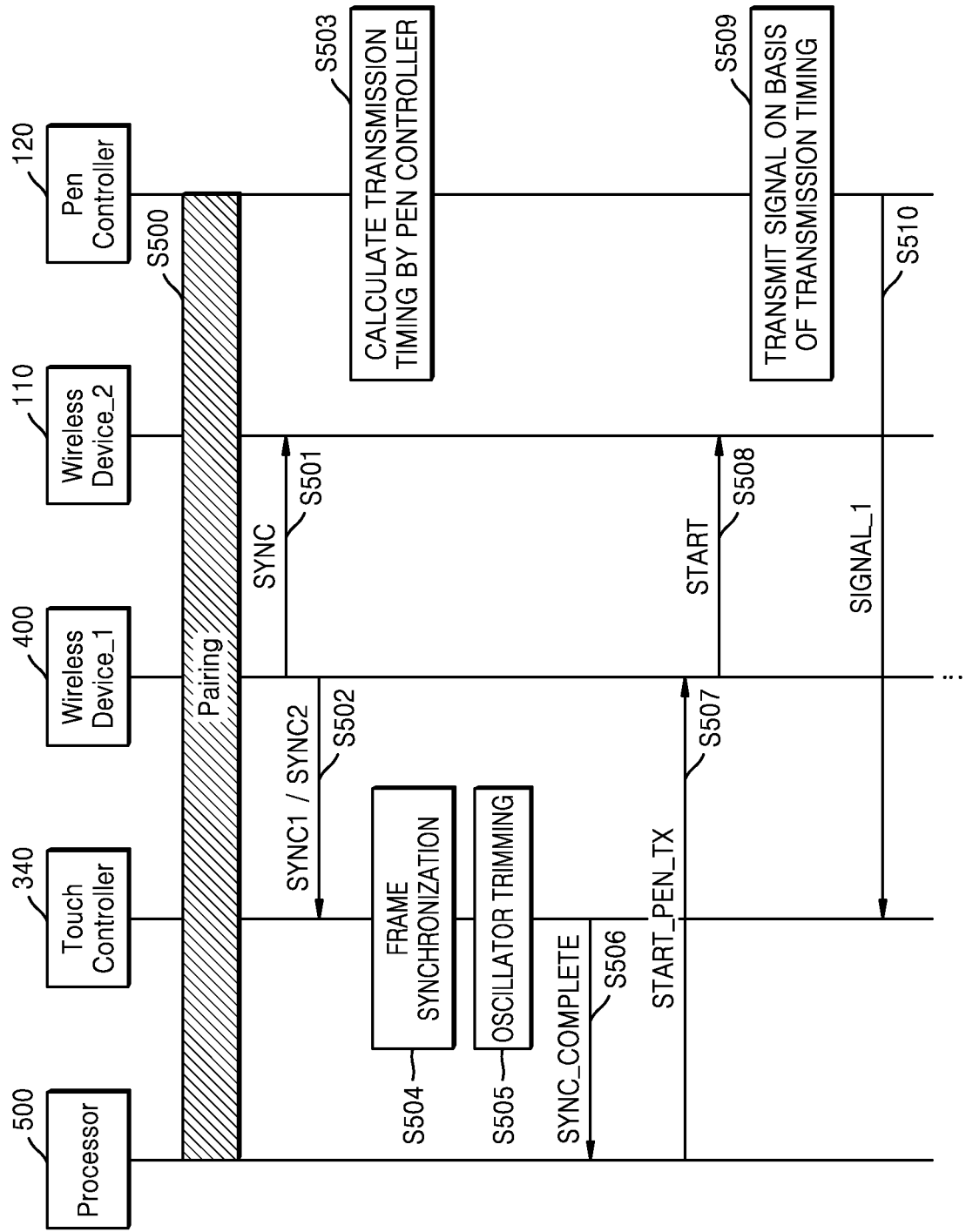
FIG. 5 is a flowchart illustrating a synchronization method according to one or more embodiments.

FIG. 5 is a flowchart illustrating a synchronization method according to one or more embodiments.

Referring to FIGS. 4 and 5, in one or more embodiments, the touch controller 340 and the active stylus pen 100 may perform synchronization on the basis of signals of the first wireless device 400 for synchronization therebetween. Before performing the synchronization, pairing may be performed in operation 500 for communication between the electronic device 10 and the active stylus pen 100. For example, a pairing operation may be an operation of transmitting and receiving a device ID between the electronic device 10 and the active stylus pen 100.

In operation S501, after the pairing is completed, the first wireless device 400 may transmit, to the second wireless device 110 of the active stylus pen 100, a synchronization start signal SYNC indicating a start of synchronization. Furthermore, in operation S502, for synchronization, the first wireless device 400 may transmit a first synchronization signal SYNC1 and a second synchronization signal SYNC2 to the touch controller 340. Although FIG. 5 illustrates that operation S502 is performed after operation S501, the embodiments are not limited thereto. In one or more embodiments, operation S501 and operation S502 may be performed in a reverse order, or may be performed in parallel with each other.

In operation S504, the touch controller 340 may perform touch frame synchronization on the basis of the first synchronization signal SYNC1 received from the first wireless device 400. The touch controller 340 may perform a frame delay for delaying a point in time for a start of a touch frame by a certain amount of time to match a touch frame period thereof with the first synchronization signal SYNC1. Furthermore, in operation S505, the touch controller 340 may perform oscillator trimming on a clock on the basis of the second synchronization signal SYNC2 received from the first wireless device 400. When the frame synchronization and the oscillator trimming according to the first synchronization signal SYNC1 and the second synchronization signal SYNC2 are completed, in operation S506, the touch controller 340 may transmit, to the processor 500, a synchronization complete signal SYNC_COMPLETE indicating that the synchronization operation of the touch controller 340 is completed.

When receiving the synchronization complete signal SYNC_COMPLETE, in operation S507, the processor 500 may transmit a transmission indication signal START PEN TX to the first wireless device 400 to notify the active stylus pen 100 that a synchronized position signal (e.g., a first position signal SIGNAL_1) of the active stylus pen 100 may be transmitted. When receiving the transmission indication signal START PEN TX, in operation S508, the first wireless device 400 may transmit, to the second wireless device 110, a start signal START indicating a signal transmission start of the active stylus pen 100.

In operation S503, the pen controller 120 may calculate a transmission timing of the position signal (e.g., the first position signal SIGNAL_1) in response to the reception of the synchronization start signal SYNC by the second wireless device 110 of the active stylus pen 100. For example, the pen controller 120 may calculate the transmission timing of the position signal to match a signal transmission timing of the active stylus pen 100 with the first synchronization signal SYNC1 provided to the touch controller 340 by the first wireless device 400. The pen controller 120 may continuously calculate a plurality of transmission timings for transmitting position signals, respectively, for example, a first transmission timing, a second transmission timing, . . . , and an $N^{th}$ transmission timing. N may be a natural number greater than or equal to 1. When the second wireless device 110 receives the start signal START from the first wireless device 400, in operation S509, the pen controller 120 may transmit, in response thereto, the position signal of the active stylus pen 100 on the basis of the calculated transmission timing. For example, in operation S510, the pen controller 120 may transmit, to the touch controller 340 via the touch panel device 200, position signals (e.g., the first signal SIGNA_1, . . . ) synchronized with a touch frame matching the first synchronization signal SYNC1 transmitted to the touch controller 340 by the first wireless device 400.

As a result, the touch controller 340 may perform a synchronization operation on the basis of the first synchronization signal SYNC1 and/or the second synchronization signal SYNC2 generated by the first wireless device 400, and the active stylus pen 100 may perform a synchronization operation on the basis of the synchronization start signal SYNC provided by the first wireless device 400. When the synchronization operation performed by each of the touch controller 340 and the active stylus pen 100 is completed, the touch controller 340 may receive the position signal of the active stylus pen 100. The synchronization method according to one or more embodiments may be performed via wireless communication, rather than a direct communication method between the touch controller 340 and the pen controller 120, and thus, advantageously reduces an effect of interference and noise. Furthermore, the synchronization method according to one or more embodiments refers to a method of directly providing a physical synchronization signal from the first wireless device 400 to the touch controller 340, and does not generate a synchronization error due to frame accumulation. Therefore, the synchronization method may simplify a communication process for synchronization therebetween, and advantageously reduces power consumption. In contrast to these features, in a method of setting synchronization between the touch controller 340 and the active stylus pen 100 by transmitting clock information of the touch controller 340 from the first wireless device 400 to the second wireless device 110 without a physical synchronization signal, an error due to frame accumulation occurs and periodic synchronization correction for correcting the error is needed. The embodiments of the present disclosure provide significant improvements over these disadvantages.

Figure 6:
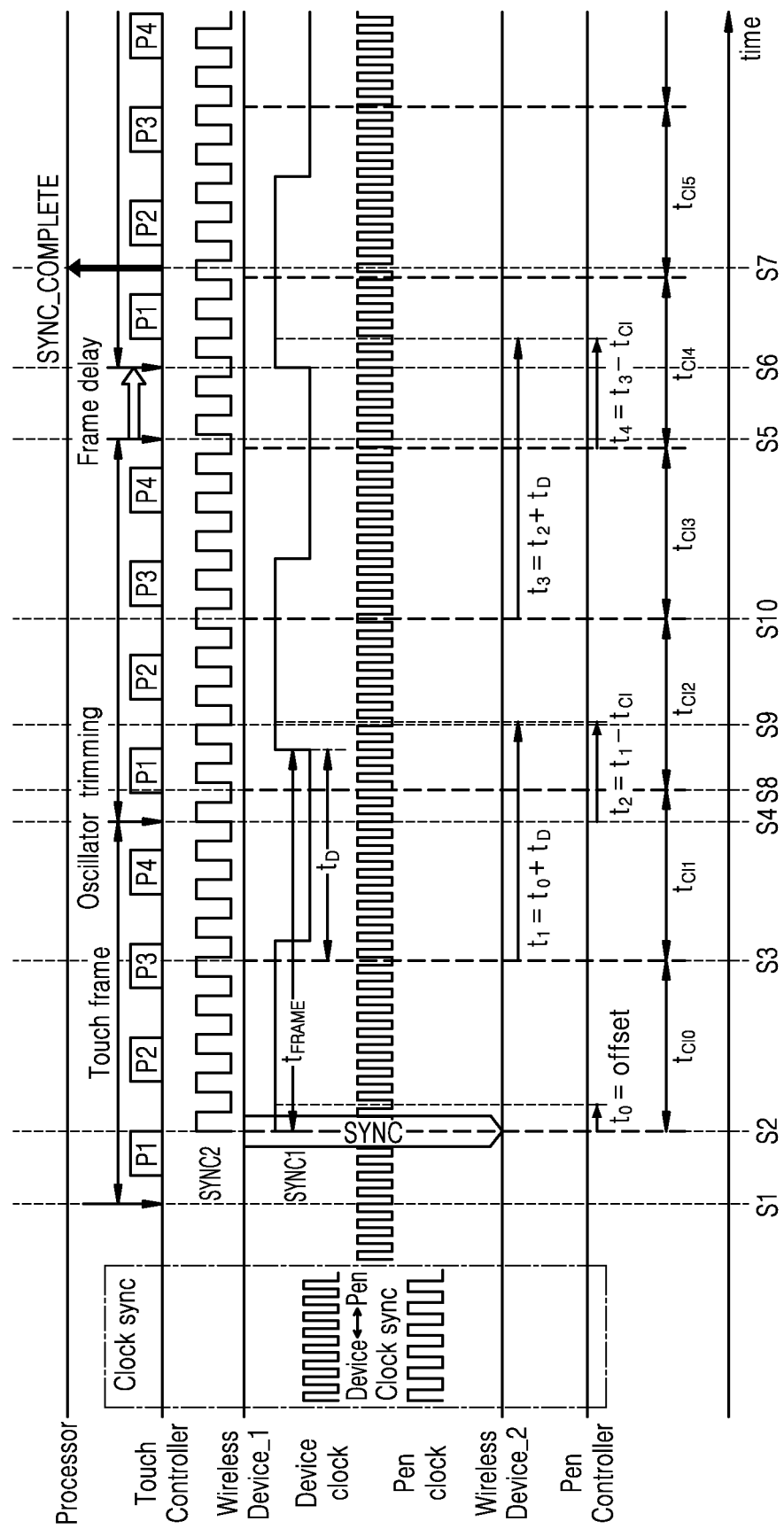
FIG. 6 is a timing diagram illustrating a process for synchronization of an electronic device and an active stylus pen, according to one or more embodiments.
Figure 7:
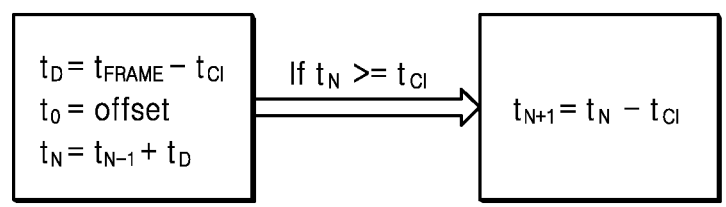
FIG. 7 is an equation illustrating a transmission timing calculation method for synchronization of an active stylus pen, according to one or more embodiments.

FIG. 6 is a timing diagram illustrating a process for synchronization of the touch controller 340 and the active stylus pen 100, according to one or more embodiments, and FIG. 7 is an equation illustrating a method of calculating a transmission timing for synchronization of the active stylus pen 100, according to one or more embodiments.

Referring to FIGS. 5 and 6, before performing synchronization, the touch controller 340 and the active stylus pen 100 may perform clock synchronization between the first wireless device 400 and the second wireless device 110. Before the synchronization starts, a touch frame period of the touch controller 340 may start at a time point 51, and the touch frame period may correspond to a time from the time point 51 to a time point S4. For example, position sensing may be performed four times (P1, P2, P3, and P4) within one period of a touch frame. However, the embodiments are not limited thereto, the touch frame period may be implemented in various aspects, and the number of times sensing a position within the touch frame period may also be implemented in various aspects.

At a time point S2, the first wireless device 400 of the electronic device 10 may, for synchronization of the touch controller 340, output a first synchronization signal SYNC1 and a second synchronization signal SYNC2 and transmit the first synchronization signal SYNC1 and the second synchronization signal SYNC2 to the touch controller 340. The first synchronization signal SYNC1 for touch frame synchronization of the touch controller 340 may have a period of tFRAME. For example, a value of tFRAME may have various values according to a communication protocol.

Furthermore, at the time point S2, the first wireless device 400 may transmit, for synchronization of the active stylus pen 100, a synchronization start signal SYNC to the second wireless device 110. The touch controller 340 may perform, on the basis of the received second synchronization signal SYNC2, oscillator trimming at the time point S4 that is a start time point of a next frame period for which the second synchronization signal SYNC2 is received.

At a time point S5, the touch controller 340 may perform a frame delay on a touch frame of the touch controller 340 to match the touch frame period with the received first synchronization signal SYNC1, and at a time point S6, the touch controller 340 may operate in the touch frame period synchronized with the first synchronization signal SYNC1. In addition, the synchronization of the touch controller 340 is completed as described above, and thus, at a time point S7, the touch controller 340 may transmit a synchronization complete signal (SYNC_COMPLETE) to the processor 500.

Referring to FIGS. 5 to 7, at the time point S2, the second wireless device 110 of the pen controller 120 may receive the synchronization start signal SYNC, and may perform, in response to the synchronization start signal SYNC, a self-calculation on a transmission timing of a position signal to synchronize the transmission timing of the position signal with the touch controller 340.

In one or more embodiments, the pen controller 120 may use a plurality of parameters (e.g., to, to (connection interval), tFRAME, $t_D$, $t_{N-1}$, $t_N$, and $t_{N+1}$) to calculate a transmission timing. The parameter $t_{CI}$ may refer to a connection interval between devices, which is set according to a Bluetooth standard. For example, $t_{CI}$ may be 7.5 ms or 15 ms. For example, $t_{CI}$ in FIG. 6 may be a parameter having a time unit between the time point S2 and the time point S3.

As described below, $t_N$ may indicate a time to elapse on the basis of an $N^{th}$ connection interval to derive a transmission timing. For example, a point in time after a time by $t_N$ elapses on the basis of the $N^{th}$ connection interval may be a signal transmission timing of the active stylus pen 100. The parameter $t_D$ may refer to a difference value between tFRAME, which is a frame period of the first synchronization signal SYNC1, and to. The parameter to may refer to an offset value according to a standard of a device.

As illustrated, connection intervals $t_{CI0}$, $t_{CI1}$, . . . may be formed at each to on the basis of the time point S2 at which the synchronization start signal SYNC is received. A time from the time point S2 to the time point S3 may be expressed as a 0th connection interval too. The pen controller 120 may derive a value of $t_1$ for calculating a transmission timing at the first connection interval $t_{CI1}$ by adding a value of $t_0$ to a value of to. Accordingly, the pen controller 120 may calculate, as a signal transmission timing of the active stylus pen 100 at the first connection interval $t_{CI1}$, a point in time after a time by $t_1$ elapses on the basis of the time point S3 which is a point in time after a time by a connection interval to elapses from the time point S2 at which the synchronization start signal SYNC is received (e.g., on the basis of a start time point of the first connection interval $t_{CI1}$). However, as illustrated, when the value of $t_1$ is greater than or equal to the value of to, a point in time (e.g., in the drawing, a time point S9) after the first connection interval elapses may be calculated as a transmission timing. Accordingly, the pen controller 120 does not need to transmit a signal of the active stylus pen 100 within the first connection interval $t_{CI1}$ (S3 to S8).

Subsequently, the pen controller 120 may calculate a transmission timing at a next connection interval, for example, a second connection interval $t_{CI2}$ (S8 to S10). Accordingly, the pen controller 120 may use the value of $t_1$ calculated at a previous connection interval to derive $t_2$. For example, the value of $t_1$ exceeds to, and thus, a value obtained by subtracting the value of to from the value of $t_1$ may be $t_2$. Accordingly, the pen controller 120 may calculate, as a signal transmission timing of the active stylus pen 100 at the second connection interval $t_{CI2}$, S9 after a time by $t_2$ elapses on the basis of a start time point S8 of the second connection interval $t_{CI2}$. Here, the value of $t_2$ is not greater than or equal to the value of to, and thus, S9 may be a first transmission timing of the pen controller 120. As a result, the pen controller 120 may continuously calculate a signal transmission timing on the basis of a calculation method as described above, for example, the calculation method illustrated in FIG. 7.

For example, the pen controller 120 may derive $t_3$ by adding the value of $t_D$ to the value of $t_2$, as described above, to calculate a transmission timing at a third connection interval $t_{CI3}$ having S10 as a start time point. Accordingly, the pen controller 120 may calculate, as a signal transmission timing of the active stylus pen 100 at the third connection interval $t_{CI3}$, a point in time after the time elapses by $t_3$ on the basis of the start time point S10 of the third connection interval $t_{CI3}$. However, as illustrated, the value of $t_3$ is greater than or equal to the value of $t_{CI}$, and thus, a point in time after the third connection interval $t_{CI3}$ elapses may be a transmission timing. Accordingly, the pen controller 120 does not need to transmit a signal of the active stylus pen 100 within the third connection interval $t_{CI3}$. Subsequently, the pen controller 120 may calculate a transmission timing at a fourth connection interval $t_{CI4}$. Accordingly, the pen controller 120 may derive, as $t_4$, a value obtained by subtracting the value of $t_{CI}$ from the value of $t_3$ calculated at a previous connection interval. Here, a value of $t_4$ is not greater than the value of $t_{CI}$, and thus, as illustrated, a point in time after a time elapses by $t_4$ on the basis of a start time point of the fourth connection interval $t_{CI4}$ may be a second transmission timing of the active stylus pen 100 at the fourth connection interval $t_{CI4}$. As described above, the pen controller 120 may continue the calculation to an $N^{th}$ signal transmission timing, where N may be a natural number greater than or equal to 1.

Figure 8:
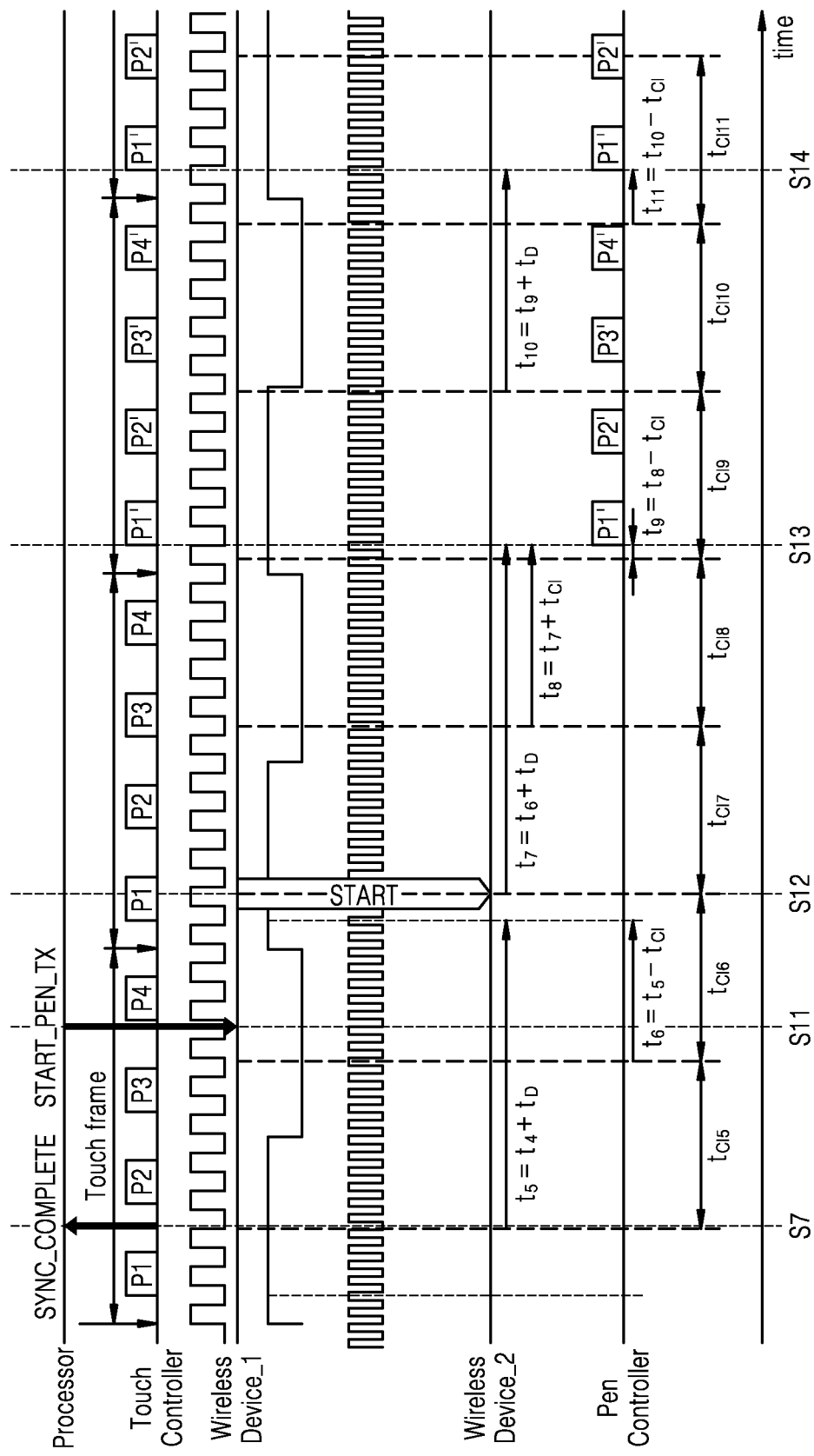
FIG. 8 is a timing diagram illustrating a position signal transmission process after synchronization, according to one or more embodiments.

FIG. 8 is a timing diagram illustrating a position signal transmission process after synchronization therebetween, according to one or more embodiments.

As described above with reference to FIGS. 6 and 7, the pen controller 120 may continuously calculate a signal transmission timing of the active stylus pen 100. The pen controller 120 may further sequentially calculate $t_1$, $t_2$, ..., and $t_{11}$ of FIGS. 6 and 8 in the same method, and, from among the same, the intervals $t_2$, $t_4$, $t_6$, $t_9$, and $t_{11}$ may be a first transmission timing, a second transmission timing, a third transmission timing, a fourth transmission timing, and a fifth transmission timing, respectively, from start time points of connection intervals respectively corresponding thereto.

At a time point S7, the touch controller 340 may transmit a synchronization complete signal SYNC_COMPLETE to the processor 500. When the processor 500 receives the synchronization complete signal SYNC_COMPLETE, at S11, the processor 500 may transmit, to the first wireless device 400, a transmission indication signal START PEN TX indicating a signal transmission start of the active stylus pen 100. When receiving the transmission indication signal START PEN TX, the first wireless device 400 may transmit, at S12, a start signal START to the second wireless device 110.

As described above, the pen controller 120 may continuously calculate a transmission timing, and, when the second wireless device 110 receives the start signal START, the pen controller 120 may transmit a position signal of the active stylus pen 100 at a transmission timing of a next connection interval. For example, the pen controller 120 may receive the start signal START at S12, and may transmit, in response thereto, position signals P1' to P4' at a calculated transmission timing.

A value of $t_7$, which is a transmission timing of a seventh connection interval $t_{CI7}$, is greater than a value of $t_{CI}$, and thus, transmission is not performed at the seventh connection interval $t_{CI7}$. Therefore, the pen controller 120 may derive a value of is (e.g., a value obtained by subtracting the value of $t_{CI}$ from the value of $t_7$) to calculate a transmission timing of a next connection interval. However, the value of is $t_8$ still greater than the value of $t_{CI}$, and thus, transmission is not performed even at an eighth connection interval $t_{CI8}$. Therefore, the pen controller 120 may derive a value of $t_9$ (e.g., a value obtained by subtracting the value of $t_{CI}$ from the value of $t_8$) to calculate a transmission timing of a next connection interval, and the value of $t_9$ is less than the value of $t_{CI}$, and thus, a time point S13 after a time elapses by $t_9$ on the basis of a start time point of a ninth connection interval $t_{CI9}$ may be a signal transmission timing at which the pen controller 120 transmits the position signals P1' to P4'. Accordingly, at a fourth transmission timing S13, the pen controller 120 may transmit a position signal of the active stylus pen 100 to the touch controller 340 via the touch panel device 200. In the same method, a time point S14 after a time elapses by interval $t_{11}$ from an eleventh connection interval $t_{CI11}$ may be a next signal transmission timing, and thus, the pen controller 120 may transmit a position signal of the active stylus pen 100 at a fifth transmission timing S14.

As a result, in the synchronization method according to one or more embodiments, periodic transmission of a synchronization signal between the electronic device 10 and the active stylus pen 100 is not needed for synchronization, and after transmission of a signal (e.g., the synchronization start signal SYNC) needed for synchronization is performed only once, synchronization is performed by a calculation of the pen controller 120, thereby advantageously reducing power consumed for the transmission of the signal. Furthermore, synchronization is performed by the touch controller 340 in response to the synchronization start signal SYNC, rather than on the basis of a synchronization signal of the touch controller 340, and thus, periodic synchronization correction for correcting an error is not needed, thereby simplifying a communication process and reducing power consumption.

Figure 9:
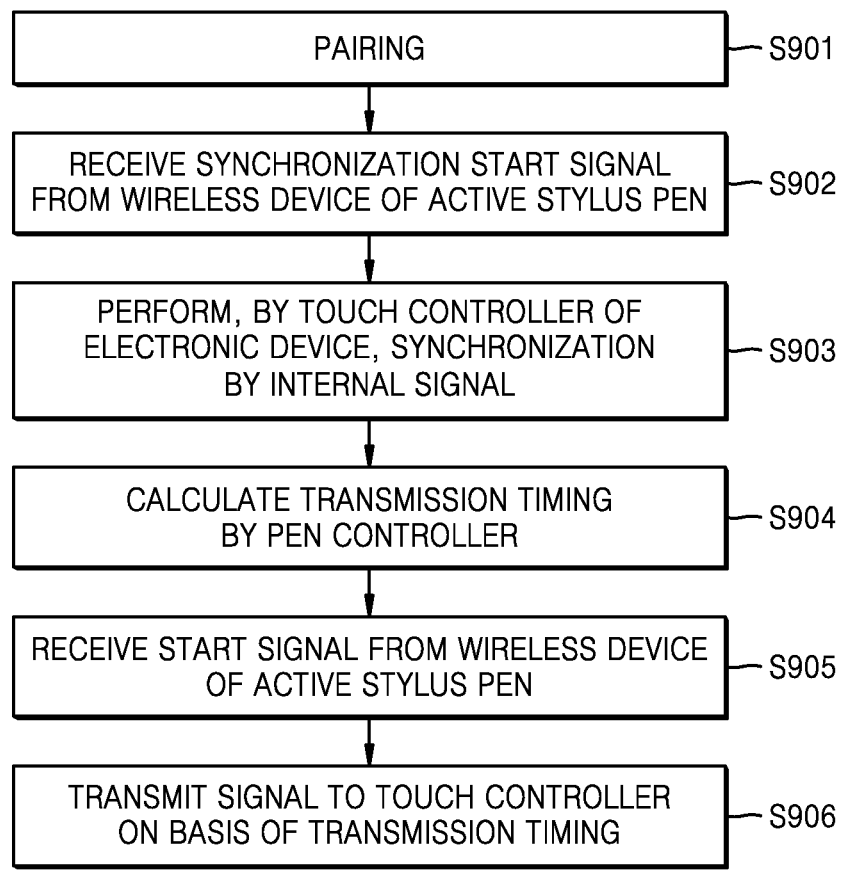
FIG. 9 is a flowchart illustrating a method of synchronization of an active stylus pen, according to one or more embodiments.

FIG. 9 is a flowchart illustrating a synchronization method of an active stylus pen, according to one or more embodiments.

Referring to FIGS. 4 to 9, in some embodiments, in operation S901, the active stylus pen 100 may first perform pairing with the electronic device 10 to perform synchronization with the touch controller 340. In operation S902, when the pairing is completed, the second wireless device 110 of the active stylus pen 100 may receive a synchronization start signal SYNC of the first wireless device 400. In operation S903, the first wireless device 400 of the electronic device 10 may transmit a synchronization signal to the touch controller 340 so that the touch controller 340 performs synchronization. In operation S904, the pen controller 120 may calculate a transmission timing in response to the synchronization start signal SYNC. In operation S905, the processor 500, which recognizes that the synchronization of the touch controller 340 is completed, may allow the first wireless device 400 to transmit, to the second wireless device 110, a start signal START indicating transmission of a signal of the active stylus pen 100, and the second wireless device 110 may receive the start signal START. In operation S906, the pen controller 120 may continuously calculate the transmission timing, and then may transmit, in response to the start signal START, a signal on the basis of a subsequent transmission timing. For example, the touch controller 340 and the active stylus pen 100 may perform synchronization in parallel on the basis of a plurality of synchronization signals of the first wireless device 400, and may transmit and receive signals therebetween after the synchronization therebetween is completed. However, a synchronization process of the active stylus pen 100 is not limited to the order according to the disclosed embodiments. In one or more embodiments, the synchronization process may be performed differently from the described order. For example, processes described sequentially may be performed substantially simultaneously, or may be performed conversely. For example, synchronization (e.g., operation S903) by one or more internal signals of the touch controller 340 of the electronic device 10 may be performed in parallel with processes (e.g., operations S902 and S904) of calculating the transmission timings of the active stylus pen 100, and is not limited to the order of the present embodiment.

Figure 10:
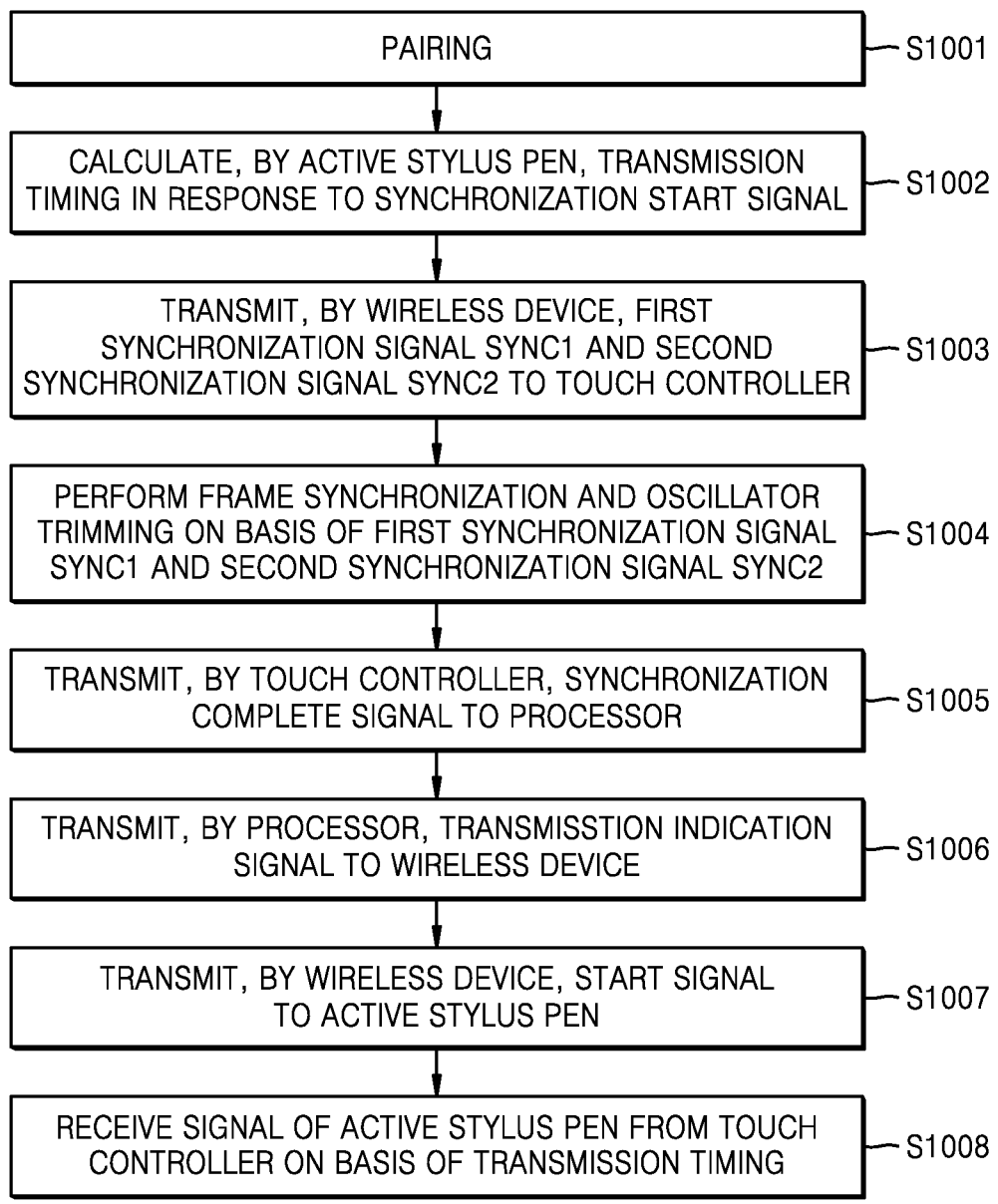
FIG. 10 is a flowchart illustrating a method of synchronization of an electronic device, according to one or more embodiments.

FIG. 10 is a flowchart illustrating a synchronization method of an electronic device, according to one or more embodiments.

Referring to FIGS. 4 to 8 and 10, in some embodiments, in operation S1001, the electronic device 10 may first perform pairing with the active stylus pen 100 to perform synchronization between the touch controller 340 and the active stylus pen 100. In operation S1002, after the pairing is completed, the second wireless device 110 of the active stylus pen 100 may receive a synchronization start signal SYNC of the first wireless device 400, and may perform synchronization therebetween by calculating a transmission timing as described above. In operation S1003, the first wireless device 400 may transmit a first synchronization signal SYNC1 and a second synchronization signal SYNC2 to the touch controller 340. In operation S1004, the touch controller 340 may perform synchronization of a frame on the basis of the first synchronization signal SYNC1, and may perform oscillator trimming on the basis of the second synchronization signal SYNC2. In the frame synchronization process, a frame delay may be performed to match a frame period with the first synchronization signal SYNC1. When the synchronization of the touch controller 340 is completed, in operation S1005, the touch controller 340 may transmit a synchronization complete signal SYNC_COMPLETE to the processor 500. In response to the synchronization complete signal SYNC COMPLETET, in operation S1006, the processor 500 may transmit a transmission indication signal START PEN TX to the first wireless device 400, and in operation S1007, the first wireless device 400 may transmit, in response thereto, a start signal START to the second wireless device 110. In response to the start signal START, in operation S1008, the active stylus pen 100 may transmit a signal on the basis of a calculated transmission timing, and the touch controller 340 may receive the signal of the active stylus pen 100 via the touch panel device 200. For example, the touch controller 340 may perform synchronization in parallel with the active stylus pen 100, and may receive a signal of the pen controller 120 according to a synchronized touch frame. However, the synchronization process of the touch controller 340 is not limited to the order according to the disclosed embodiments. In one or more embodiments, the synchronization process may be performed differently from the described order. For example, processes described sequentially may be performed substantially simultaneously, or may be performed conversely. For example, the process (operation S1002) of calculating the transmission timing by the active stylus pen 100 in response to the synchronization start signal SYNC may be performed in parallel with the synchronization processes (operations S1003 to S1005) of the touch controller 340, and is not limited to the order of the disclosed embodiments.

Figure 11:
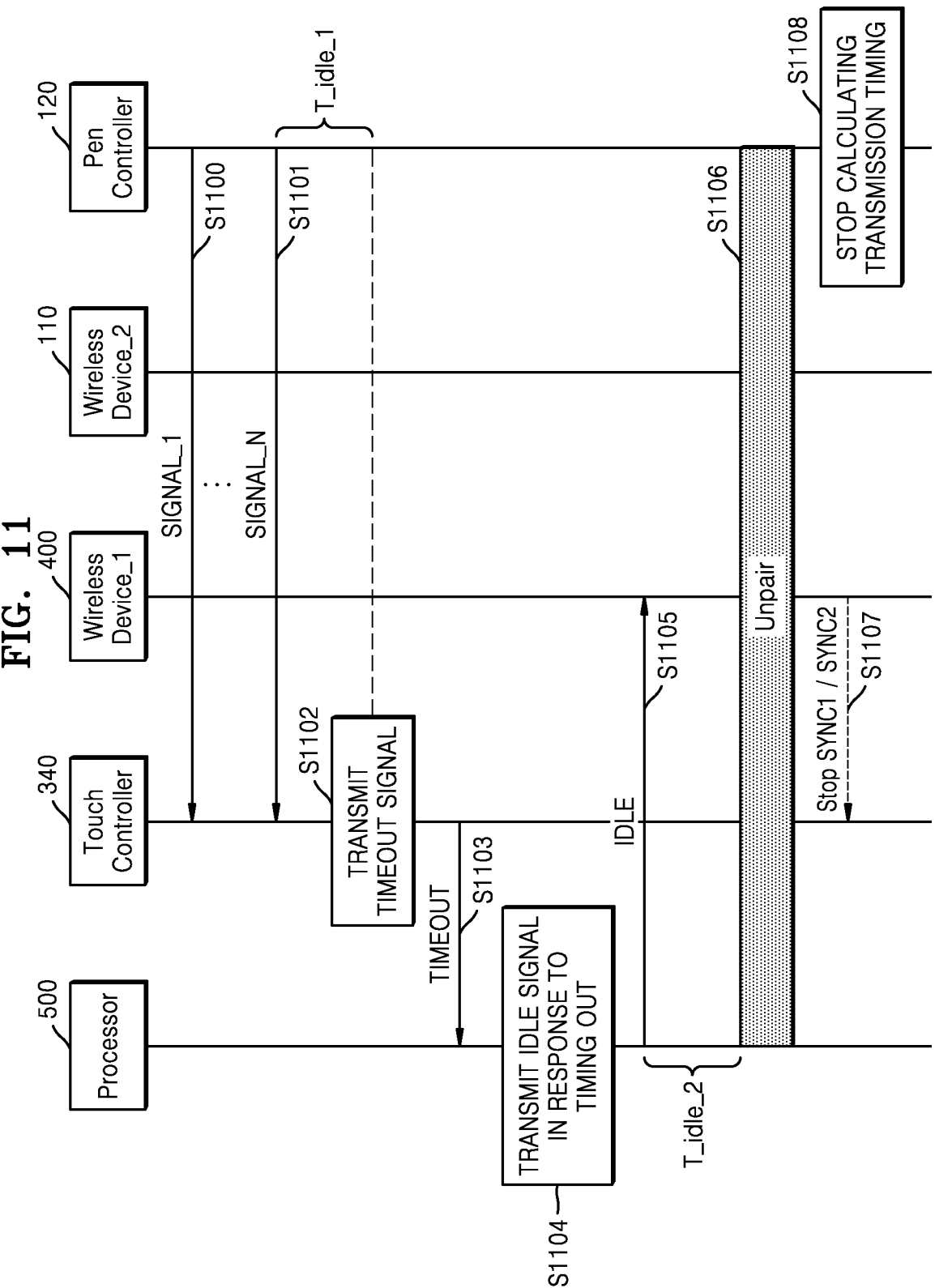
FIG. 11 is a flowchart illustrating a process of stopping pairing of an electronic device and an active stylus pen, according to one or more embodiments.

FIG. 11 is a flowchart illustrating a process of stopping pairing of an electronic device and an active stylus pen, according to one or more embodiments.

Referring to FIGS. 4, 5, and 11, in one or more embodiments, when a signal is not transmitted from the active stylus pen 100 for a certain period of time, the electronic device 10 may enter an idle mode and/or may perform unpairing. As described above, the pen controller 120 may continuously transmit a signal according to a transmission timing. For example, referring to FIGS. 5 and 11, in operations 51100 and 51101, the pen controller 120 may transmit position signals SIGNAL_1, . . . , and SIGNAL_N to the touch controller 340 according to a calculated transmission timing. After an $N^{th}$ signal transmission is performed, an input from a user or the like may stop, and thus, a signal of the active stylus pen 100 may not be received from the pen controller 120. When a signal is not received from the pen controller 120 during a first period T_idle_1, in operations 51102 and 51103, the touch controller 340 may transmit a timeout signal TIMEOUT to the processor 500. The reception of the timeout signal TIMEOUT indicates that an input is not received for a certain period of time, and thus, the processor 500 is in an idle state. Therefore, in operations S1104 and S1105, the processor 500 may transmit, to the first wireless device 400, an idle signal IDLE indicating entry into an idle mode.

In one or more embodiments, when the electronic device 10 enters the idle mode, the processor 500 and/or the first wireless device 400 may perform an operation for reducing power consumption. For example, the processor 500 and/or the first wireless device 400 may perform an operation of increasing a connection interval. In other words, according to standards such as Bluetooth, the processor 500 and/or the first wireless device 400 advantageously reduces, via an operation of increasing a value of interval to, power consumed for transmission and reception of signals between the electronic device 10 and the active stylus pen 100. Even after entering an idle duration, when an input is not received from the pen controller 120 during a second period T_idle_2, in operation S1106, the processor 500 may perform an unpairing operation of stopping pairing with the active stylus pen 100. The first period T_idle_1 and the second period T_idle_2 may be preset times.

When a connection between devices is disconnected, the touch controller 340 and the active stylus pen 100 no longer need to perform synchronization therebetween, and thus, in operation S1107, the first wireless device 400 may stop transmitting the first synchronization signal SYNC1 and the second synchronization signal SYNC2 to the touch controller 340. In operation S1108, the pen controller 120 of the active stylus pen 100 may also stop calculating a transmission timing of a signal. As a result, via the entry into the idle mode and/or the unpairing operation on the basis of whether or not a user input is received by the electronic device 10, the electronic device 10 and/or the active stylus pen 100 may efficiently manage power consumption due to signal transmission and reception.

Figure 12:
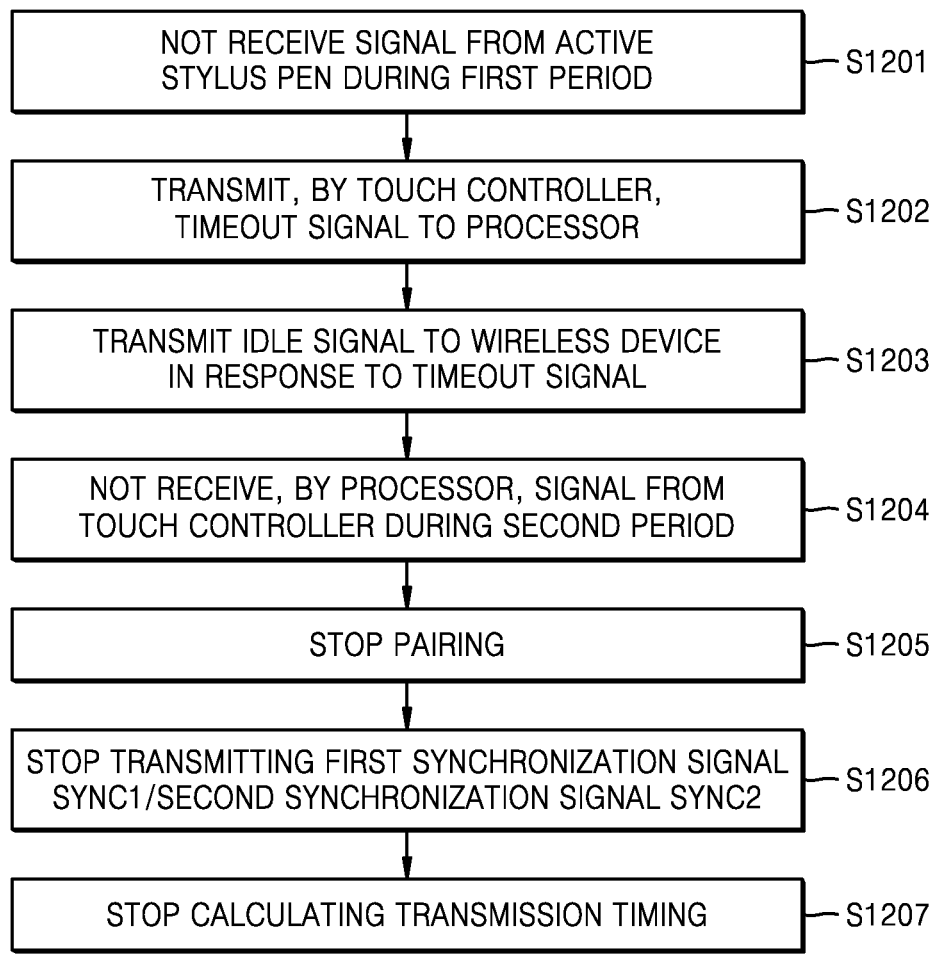
FIG. 12 is a flowchart illustrating a method of stopping pairing, according to one or more embodiments.

FIG. 12 is a flowchart illustrating a method of stopping pairing, according to one or more embodiments.

Referring to FIGS. 11 and 12, when a user's input or the like is not received, a signal of the active stylus pen 100 may not be received by the electronic device 10. When the touch controller 340 does not receive a signal from the active stylus pen 100 during a first period T_idle_1 in operation 51201, in operation 51202, the touch controller 340 may transmit a timeout signal TIMEOUT to the processor 500 to enter an idle mode. In operation S1203, the processor 500 may transmit an idle signal IDLE to the first wireless device 400 in response to the timeout signal TIMEOUT. When the processor 500 and/or the first wireless device 400 enters the idle mode in response to the idle signal IDLE, the processor 500 and/or the first wireless device 400 may perform, for example, an operation of increasing a connection interval to reduce power consumption, and may advantageously reduce power consumed for signal transmission and reception between devices. When, in operation S1204, the signal of the active stylus pen 100 is not received from the touch controller 340 for a second period T_idle_2 even after entering the idle mode, in operation S1205, the processor 500 may perform an unpairing operation of disconnecting from the active stylus pen 100. In operation S1206, the first wireless device 400 may stop transmitting a first synchronization signal SYNC1 and a second synchronization signal SYNC2 to the touch controller 340, and in operation S1207, the pen controller 120 may stop calculating a signal transmission timing, to prevent unneeded power consumption when connection stops. However, the unpairing operation process is not limited to the order according to the disclosed embodiments. In one or more embodiments, the unpairing operation process may be performed differently from the described order. For example, processes described sequentially may be performed substantially simultaneously, or may be performed conversely. For example, when the pairing stops in operation S1205, the calculation of the transmission timing by the pen controller 120 first may stop in operation S1207, and then the transmission of the first synchronization signal SYNC1 and the second synchronization signal SYNC2 may stop in operation S1206.

Figure 13:
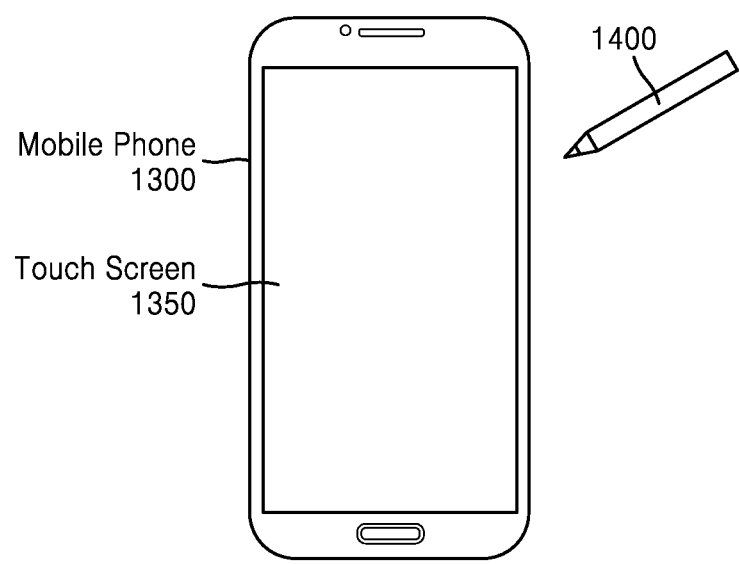
FIG. 13 is a view illustrating a mobile system to which one or more embodiments is applied.

FIG. 13 is a view illustrating a mobile system to which one or more embodiments is applied.

Referring to FIGS. 4 and 13, a mobile system may include a mobile phone 1300, a touch screen 1350 of the mobile phone 1300, and an active stylus pen 1400. In one or more embodiments, the mobile phone 1300 may be the electronic device 10 described with reference to FIGS. 1 to 12, and the active stylus pen 1400 may be the active stylus pen 100 described with reference to FIGS. 1 to 12.

The active stylus pen 1400 may perform an input function of a user or any other pen operation on the mobile phone 1300 by touching the touch screen 1350 of the mobile phone 1300. The active stylus pen 1400 may receive a signal (e.g., a synchronization signal) by forming a communication channel with a wireless device 400 of the mobile phone 1300 via a wireless device 110 of the active stylus pen 1400. The mobile system may use short-range communication including, for example, Bluetooth, infrared communication, or any other short-range communication known to one of ordinary skill in the art, for communication between the mobile phone 1300 and the active stylus pen 1400. In one or more embodiments, the mobile phone 1300 may include the touch screen 1350 for detecting a touch signal or any other signal. When receiving a signal of the active stylus pen 1400 via the touch screen 1350, the mobile phone 1300 may generate a control signal corresponding thereto. For example, the mobile phone 1300 may sense, via the touch screen 1350, a signal generated by a position signal of the active stylus pen 1400.

The mobile phone 1300 may use the wireless device 400 of the mobile phone 1300 for synchronization between the mobile phone 1300 and the active stylus pen 1400. The wireless device 400 of the mobile phone 1300 may transmit, to the wireless device 110 of the active stylus pen 1400, a signal (e.g., a synchronization start signal SYNC) indicating that synchronization starts, to synchronize the active stylus pen 1400 with the mobile phone 1300. In response thereto, the active stylus pen 1400 may perform synchronization via a pen controller 120 of the active stylus pen 1400. The pen controller 120 of the active stylus pen 1400 may calculate a transmission timing of a position signal, and may transmit, on the basis of the same, a position signal of the active stylus pen 1400 to the mobile phone 1300 via the touch screen 1350 of the mobile phone 1300.

The mobile phone 1300 may synchronize with the active stylus pen 1400 by using one or more internal signals of the mobile phone 1300. The wireless device 400 of the mobile phone 1300 may transmit a touch frame synchronization signal and/or an oscillator trimming signal to the touch controller 340 of the mobile phone 1300. The touch controller 340 of the mobile phone 1300 may perform synchronization on the basis of the touch frame synchronization signal and/or the oscillator trimming signal. When the synchronization is completed, the touch controller 340 of the mobile phone 1300 may notify a processor 500 of the mobile phone 1300 that the synchronization is completed, and in response to the notification, the processor 500 of the mobile phone 1300 may transmit, to the active stylus pen 1400 via the wireless device of the mobile phone 1300, a signal indicating that signal transmission may start. The pen controller 120 of the active stylus pen 1400 may transmit, on the basis of a transmission timing calculated thereby as described above, the signal of the active stylus pen 1400 to the touch controller 340 of the mobile phone 1300 via the touch screen 1350.

When a signal is not transmitted from the active stylus pen 1400 during a certain period of time, the mobile phone 1300 may enter an idle mode and/or perform unpairing therebetween. When a connection between devices is disconnected via the unpairing therebetween, the wireless device 400 of the mobile phone 1300 may stop transmitting one or more internal signals for synchronization therebetween to the touch controller 340 of the mobile phone 1300. The pen controller 120 of the active stylus pen 1400 may also stop calculating the transmission timing of the signal. Accordingly, the mobile phone 1300 and/or the active stylus pen 1400 may efficiently manage power consumption due to signal transmission and reception.

As a result, each of the mobile phone 1300 and the active stylus pen 1400 may perform synchronization on the basis of synchronization signals of the wireless device 400 of the mobile phone 1300. A synchronization method according to one or more embodiments may be performed via wireless communication rather than a direct communication method, and thus, may advantageously reduce an effect of interference and noise. Furthermore, a signal needed for synchronization of the active stylus pen 1400 may be transmitted once, and thus, periodic synchronization correction may not be needed, thereby simplifying a communication process and effectively reducing power consumption.

While the embodiments have been particularly shown and described with reference to embodiments thereof, it will be understood that various changes in form and details may be made therein without departing from the spirit and scope of the following claims.

What is claimed is:

1. A method of synchronizing an active stylus pen with an electronic device, the method comprising:
   receiving, by the active stylus pen, a synchronization start signal from the electronic device via wireless communication;
   in response to receiving the synchronization start signal, calculating, by the active stylus pen, a plurality of transmission timings at which a position signal corresponding to a position of the active stylus pen is transmitted to the electronic device, the calculating being performed on the basis of a point in time at which the synchronization start signal is received; and
   transmitting, by the active stylus pen on the basis of the plurality of transmission timings, the position signal to the electronic device.

2. The method of claim 1, wherein the calculating the plurality of transmission timings includes:
   calculating a first transmission timing from the point in time at which the synchronization start signal is received; and
   sequentially repeating the timing calculation from the first transmission timing to an $N^{th}$ transmission timing,
   wherein N is a natural number greater than or equal to 2.

3. The method of claim 1, wherein the transmitting the position signal includes transmitting the position signal to the electronic device on the basis of at least one transmission timing selected from among the plurality of transmission timings.

4. The method of claim 1, further comprising stopping calculating the plurality of transmission timings in response to stop of a pairing between the active stylus pen and the electronic device stops.

5. The method of claim 1, wherein the transmitting the position signal includes transmitting the position signal on the basis of the plurality of transmission timings after the active stylus pen receives a start signal.

6. The method of claim 1, wherein the calculating the plurality of transmission timings includes using parameters indicating an offset, a connection interval, and a frame period.

7. The method of claim 1, further comprising performing a clock synchronization between the electronic device and the active stylus pen before the active stylus pen receives the synchronization start signal.

8. An electronic device configured to synchronize with an active stylus pen, the electronic device comprising:
a processor;
a touch panel configured to detect a position signal of the active stylus pen;
a wireless device configured to transmit a synchronization start signal to the active stylus pen via wireless communication; and
a touch controller configured to perform frame synchronization by receiving a first synchronization signal from the wireless device, wherein the touch controller is configured to receive, via the touch panel, the position signal of the active stylus pen synchronized on the basis of the synchronization start signal.

9. The electronic device of claim 8, wherein the wireless device is configured to transmit a second synchronization signal to the touch controller, and the touch controller is configured to perform oscillator trimming on a clock on the basis of the second synchronization signal.

10. The electronic device of claim 8, wherein the touch controller performs a frame delay on the basis of the first synchronization signal to perform the frame synchronization.

11. The electronic device of claim 8, wherein the touch controller is configured to transmit a synchronization complete signal to the processor in response to a completion of the frame synchronization, the processor is configured to transmit a first start signal to the wireless device in response to reception of the synchronization complete signal, and the wireless device is configured to transmit a second start signal to the active stylus pen in response to reception of the first start signal.

12. The electronic device of claim 8, wherein the touch controller is configured to transmit a timeout signal to the processor in response to not receiving the position signal of the active stylus pen during a first period.

13. The electronic device of claim 12, wherein the processor is configured to transmit an idle signal to the wireless device in response to reception of the timeout signal.

14. The electronic device of claim 13, wherein the processor is configured to stop pairing with the active stylus pen in response to not receiving the position signal of the active stylus pen via the touch controller during a second period after transmitting the idle signal.

15. The electronic device of claim 14, wherein the wireless device is configured to stop transmitting the first synchronization signal to the touch controller in response to the pairing being stopped.

16. The electronic device of claim 8, wherein the electronic device is configured to perform clock synchronization with the active stylus pen before the wireless device transmits the synchronization start signal to the active stylus pen.

17. An active stylus pen configured to synchronize with an electronic device, the active stylus pen comprising:
at least one electrode;
a wireless device configured to receive a synchronization start signal from the electronic device via wireless communication; and
a controller configured to transmit a position signal to the electronic device via the at least one electrode, wherein the controller is configured to calculate, in response to reception of the synchronization start signal, a plurality of transmission timings of the position signal on the basis of a point in time at which the synchronization start signal is received.

18. The active stylus pen of claim 17, wherein the controller is configured to calculate a first transmission timing from the point in time at which the synchronization start signal is received, and configured to sequentially repeat the timing calculation from the first transmission timing to an $N^{th}$ transmission timing, wherein N is a natural number greater than or equal to 2.

19. The active stylus pen of claim 17, wherein the controller is configured to select at least one transmission timing from among the plurality of transmission timings of the position signal, and configured to transmit the position signal to the electronic device on the basis of each of the selected at least one transmission timing.

20. The active stylus pen of claim 17, wherein the controller is configured to transmit the position signal on the basis of the plurality of transmission timings of the position signal after the wireless device receives a start signal from the electronic device, wherein the start signal is received after synchronization start signal.

* * * * *